(No Model.)
L. J. HIRT.
APPARATUS FOR ELIMINATING NAPHTHALENE FROM GAS.
No. 598,707. Patented Feb. 8, 1898.
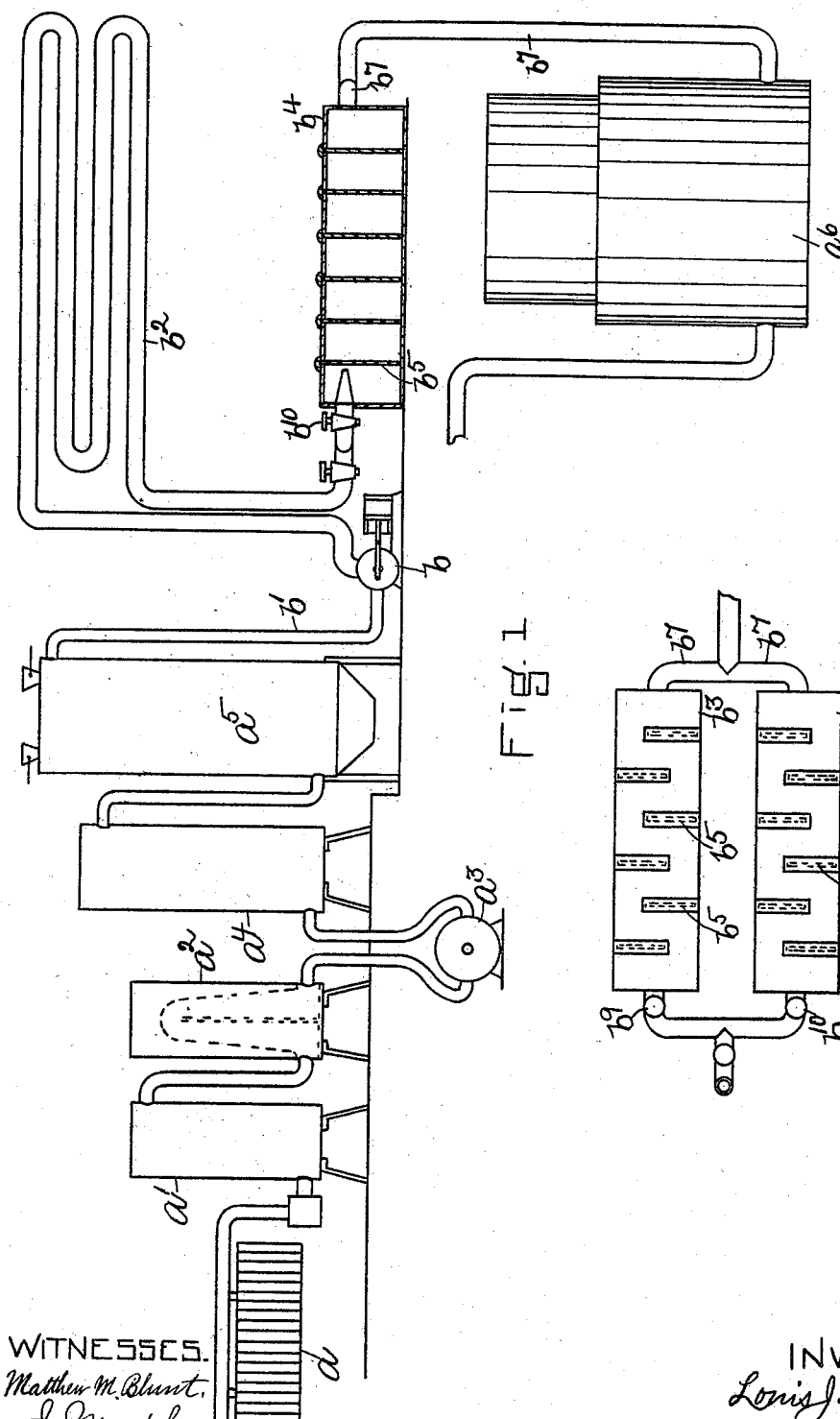
WITNESSES.
Matthew M. Blunt.
J. Murphy
INVENTOR
Louis J. Hirt
Jas. H. Churchill
ATT'Y

UNITED STATES PATENT OFFICE.

LOUIS J. HIRT, OF BROOKLINE, MASSACHUSETTS.

APPARATUS FOR ELIMINATING NAPHTHALENE FROM GAS.

SPECIFICATION forming part of Letters Patent No. 598,707, dated February 8, 1898.

Application filed June 26, 1897. Serial No. 642,374. (No model.)

*To all whom it may concern:*

Be it known that I, LOUIS J. HIRT, residing in Brookline, in the county of Norfolk and State of Massachusetts, have invented an Improvement in Apparatus for Extracting Naphthalene, of which the following description, in connection with the accompanying drawings, is a specification, like letters on the drawings representing like parts.

This invention relates to a novel apparatus for extracting naphthalene from coal or other gas.

In accordance with this invention the gas, which may be produced in any usual or well-known manner, is reduced in temperature and brought into contact with, preferably, a plurality of removable surfaces within a suitable apparatus or chamber and upon which the naphthalene in the gas is deposited in crystalline form. The gas freed from naphthalene may be collected in a suitable holder, and the naphthalene deposited on the removable surfaces may be dissolved in naphtha or other solvent by removing the collecting-surfaces and immersing them in a vessel or tank containing the solvent.

Figure 1 represents in elevation a coal-gas plant provided with a naphthalene-extracting apparatus embodying this invention, and Fig. 2 a detail to be referred to.

In the present instance I have shown my invention as employed in connection with a coal-gas plant comprising retorts $a$, cooler $a'$, tar-chamber $a^2$, exhaust-pump $a^3$, ammonia-tower $a^4$, and gas-purifier $a^5$, which apparatus may be of any suitable or desired construction.

In accordance with this invention the gas from the purifier is reduced in temperature before passing to the holder $a^6$ or to the service-pipes, and this result may be effected by first increasing the pressure above that of the gas in the purifier and then reducing the temperature to or below the point at which the naphthalene crystallizes out and obstructing the flow of the gas, so as to cause the naphthalene in the gas to be deposited upon surfaces preferably capable of being removed from the course of the gas, so that they may be immersed in suitable vessels or tanks containing naphtha or other solvent for the naphthalene.

The pressure of the gas passing out from the purifier $a^5$ may be increased by a suitable pump or engine $b$ of any suitable construction, which, as herein shown, has its inlet-port connected to the outlet-pipe $b'$ of the purifier and its outlet-port connected to a refrigerating apparatus represented as a coil of pipes $b^2$, which in practice are cooled by water running over them, so as to reduce the temperature of the gas in said pipes, which temperature is further reduced, as herein shown, by permitting the gas in the pipes $b^2$ to pass in a restricted quantity into an expansion-chamber. In the present instance the outlet end of the refrigerating-coil $b^2$ is shown as connected to two chambers $b^3$ $b^4$ (see Fig. 2) of substantially large capacity to effect a reduction in the pressure and temperature of the gas, and which are provided with preferably removable surfaces, preferably metal plates $b^5$, which are staggered to obtain an irregular passage of the gas from the point of entrance to the outlet of the said chambers.

The plates $b^5$ are preferably removable from the top of the apparatus. The extracting-chambers $b^3$ $b^4$ may be connected by the branched outlet-pipe $b^7$ with the gas-holder $a^6$, and the branches of the inlet-pipe may be provided with valves $b^9$ $b^{10}$, which in practice may, and preferably will, be automatically operated by the pressure in the extracting-chambers, but which are herein represented as hand-operated valves.

The gas may, and preferably will, be passed through one chamber, as $b^3$, to the holder $a^6$, while the other chamber $b^4$ is cut off from the coil $b^2$ by closing the valve $b^{10}$, and so, also, the chamber $b^3$ may be cut off from the coil $b^2$ by closing the valve $b^9$ when the gas is passing through the chamber $b^4$. This arrangement permits the deposited naphthalene in one chamber to be removed while the naphthalene is being deposited in the other chamber.

I claim—

1. The combination with a gas-producing apparatus including a gas-generator and a holder, of a naphthalene-extracting apparatus intermediate of said generator and holder and comprising a refrigerating apparatus connected to said gas-generator, and an expansion-chamber having its inlet connected to the refrigerating apparatus and its outlet to the said holder, substantially as described.

2. The combination with a gas-producing apparatus, of a naphthalene-extracting apparatus comprising means to reduce the temperature of the gas, and a chamber provided with a removable surface upon which the naphthalene is deposited, substantially as described.

3. The combination with a gas-producing apparatus, of a naphthalene-extracting apparatus comprising a refrigerating apparatus through which the hot gas is passed, and a chamber connected to the refrigerating apparatus and provided with a plurality of removable plates or surfaces arranged in the chamber to obtain a staggered effect and upon which the naphthalene is deposited.

4. The combination with a gas-producing apparatus, of a naphthalene-extracting apparatus comprising means to reduce the temperature of the gas, and a chamber provided with an obstructing-surface upon which the naphthalene is deposited, substantially as described.

In testimony whereof I have signed my name to this specification in the presence of two subscribing witnesses.

LOUIS J. HIRT.

Witnesses:
JAS. H. CHURCHILL,
J. MURPHY.